United States Patent
Gerlitz et al.

[11] Patent Number: 5,990,192
[45] Date of Patent: Nov. 23, 1999

[54] RADIATION-CURABLE WATER-DILUTABLE URETHANE RESINS, PREPARATION PROCESS AND USE

[75] Inventors: Martin Gerlitz; Rami-Raimund Awad; Ulrike Kuttler; Thomas Fraydl, all of Graz; Martin Leitner, Gamlitz; Andreas Kocsar, Graz, all of Austria

[73] Assignee: Vianova Resins AG, Graz, Australia

[21] Appl. No.: 09/057,583

[22] Filed: Apr. 9, 1998

[30] Foreign Application Priority Data

Apr. 9, 1997 [AT] Austria ........................................ 599/97

[51] Int. Cl.⁶ .................................................. C08G 18/62
[52] U.S. Cl. ................................ 522/93; 522/97; 522/98; 524/591; 428/425.1; 526/301; 528/71; 528/75
[58] Field of Search ................................ 522/98, 93, 97; 524/591; 428/425.1; 526/301; 528/75, 71

[56] References Cited

U.S. PATENT DOCUMENTS 5,596,065   1/1997   Gerlitz et al. ............................... 528/71

FOREIGN PATENT DOCUMENTS 0 694 531   1/1996   European Pat. Off. .

Primary Examiner—Rachel Gorr
Attorney, Agent, or Firm—Foley & Lardner

[57] ABSTRACT

Radiation-curable water-dilutable urethane resins obtainable by reacting cycloaliphatic and/or aromatic diisocyanates with a mixture of a (meth)acryloyl-containing dihydroxy compound in an amount such that the amount of reactive hydroxyl groups present therein is from 0.2 to 0.6 mol, and with a tri or tetrahydric polyol which has been partly esterified with (meth)acrylic acid and has a residual average hydroxyl functionality of from 1.0 to 1.4 in the molecule, in an amount such that the amount of the reactive hydroxyl groups is from 0.4 to 0.8 mol, the sum of the amounts of the reactive hydroxyl groups always being 1.0 mol, and from 40 to 60% of the isocyanate groups being converted into urethane groups, and reacting the resulting intermediate with an aliphatic saturated monocarboxylic acid having at least two hydroxyl groups in an amount such that the amount of the reactive hydroxyl groups is from 0.6 to 1 mol, until the hydroxyl groups have undergone complete reaction and reacting this product, if desired, with further part-esterified polyol in an amount such that the amount of hydroxyl groups in the polyol is from 0 to 0.5 mol until the remaining free isocyanate groups have undergone complete reaction, the molar proportions of the components being chosen so that the ratio of the number of isocyanate groups to the number of hydroxyl groups is from 0.9:1 to 1:1 and the reaction product possesses carboxyl groups in accordance with an acid number of from 20 to 40 mg/g and has a specific double bond content of not more than 3.5 mol/kg.

10 Claims, No Drawings

RADIATION-CURABLE WATER-DILUTABLE URETHANE RESINS, PREPARATION PROCESS AND USE

BACKGROUND OF THE INVENTION

1. Field of the Invention

The invention relates to water-dilutable urethane resins, to processes for their preparation, and to their use; for example, as binders for coating materials which can be crosslinked by free-radical polymerization and which, in the form in which they are employed, are free from monomers, dried physically and, as a coating film, show a high degree of crosslinking.

2. Description of Related Art

Urethane resins have been described in EP 0694531 A2, where the incorporation of (meth)acryloyl-containing allophanate structures allows an increase to be obtained in the crosslinking density. A disadvantage of the resins, however, is that coating materials based on such resins do not, prior to radiation curing, achieve the adequate physical drying of the coating films that is required specifically for the painting of wood.

SUMMARY OF THE INVENTION

It has now been found that products showing a substantial improvement in their physical drying in comparison to the urethane resins obtained in accordance with EP 0694531 A2 can be produced if, by means of specific process steps, a controlled distribution of the (meth)acryloyl groups along the polymer chain is achieved. With this process, in addition, there is no need to incorporate additional allophanate, biuret, uretdione or isocyanurate structures.

It is an object of the present invention to provide urethane resins having advantageous properties, and method of making and using such resins.

In accordance with these and other objectives, there has been provided a radiation-curable, water-dilutable urethane resin obtained by reacting, in a first reaction step,
(A) 1.0 mol of one or more of a cycloaliphatic aromatic diisocyanate with
(B1) a (meth)acryloyl-containing dihydroxy compound in an amount such that the amount of reactive hydroxyl groups in (B1) is from 0.2 to 0.6 mol, and
(B2) a tri- or tetrahydric polyol which has been partly esterified with (meth)acrylic acid and has a residual average hydroxyl functionality of from 1.0 to 1.4 in the molecule, in an amount such that the amount of the reactive hydroxyl groups in (B2) is from 0.4 to 0.8 mol, the amounts of (B1) and (B2) being chosen so that the sum of the amounts of the reactive hydroxyl groups of (B1) and (B2) in the first step is 1.0 mol, whereby from 40 to 60% of the isocyanate groups of (A) are converted into urethane groups; and
subsequently reacting the resulting intermediate with
(C) an aliphatic saturated monocarboxylic acid having at least two hydroxyl groups, wherein the amount of the reactive hydroxyl groups is from 0.6 to 1 mol,
until the hydroxyl groups (C) have undergone complete reaction, and, if desired, reacting this product with further polyol (B2) in an amount such that the amount of hydroxyl groups of (B2) is from 0 to 0.5 mol, until the remaining free isocyanate groups have undergone complete reaction, the molar proportions of the components (A) to (C) being chosen so that the number of isocyanate groups and hydroxyl groups present in components (A) to (C) are in a ratio to one another of from 0.9:1 to 1:1, and
wherein the reaction product possesses carboxyl groups in accordance with an acid number of from 20 to 40 mg/g and has a specific double bond content of not more than 3.5 mol/kg.

In accordance with these and other objectives, there has been provided a process for preparing radiation-curable water-dilutable urethane resins as described above, wherein a first stage (A) 1.0 mol of one or more of a cycloaliphatic or aromatic diisocyanate is reacted with a mixture (B) comprising
(B1) a (meth)acryloyl-containing dihydroxy compound and
(B2) a tri- or tetrahydric polyol which has been partly esterified with (meth)acrylic acid and has a residual average hydroxyl functionality of from 1.0 to 1.4 in the molecule,
the amounts of (B1) and (B2) being chosen so that the amounts of (B1) and (B2) being chosen so that the amount of the reactive hydroxyl groups in (B1) ($n_{OH}(B1)$) is from 0.2 to 0.6 mol and the amount of the reactive hydroxyl groups in (B2) ($n_{OH}(B1)$) is from 0.8 to 0.4 mol, the sum $n_{OH}(B1)+n_{OH}(B^2)$ being equal to 1 mol, in such a way that 50% of the isocyanate groups of (A) are converted into urethane groups, and, in the second stage, the resulting intermediate is subsequently reacted with
(C) an aliphatic saturated monocarboxylic acid having at least two hydroxyl groups in an amount such that the amount of the reactive hydroxyl groups is from 0.6 to 1 mol
until the hydroxyl groups of (C) have undergone complete reaction, and optionally, in a third step, the product is reacted with further polyol (B2) in an amount such that the amount of hydroxyl groups of this portion of (B2) is from 0 to 0.5 mol, until the remaining free isocyanate groups have undergone complete reaction,
the molar proportions of the components (A) to (C) in all three steps being chosen so that the number of isocyanate groups present in component (A) and the number of hydroxyl groups present in total in components (B1), (B2), and (C) are in a ratio to one another of from 0.9:1 to 1:1; and wherein the reaction product possesses carboxyl groups in accordance with an acid number of 20 to 40 mg/g and has a specific double bond content of not more than 3.5 mol/kg.

There is also provided an aqueous dispersion of a radiation-curable water-dilutable urethane resin comprising a urethane resin as described above, in which at least 40% of the carboxyl groups originally present in the resin have been converted into carboxylate groups.

There is also provided wood coated with a coating composition that includes a urethane resin described above.

Further objects, features, and advantages of the invention will become apparent from the detailed description of preferred embodiments that follows.

DETAILED DESCRIPTION OF PREFERRED EMBODIMENTS

The present invention relates to radiation-curable water-dilutable urethane resins which are obtainable by reacting, in a first reaction step, (A) 1.0 mol of a cycloaliphatic and/or aromatic diusocyanate with a mixture
(B1) of a (meth)acryloyl-containing dihydroxy compound in an amount such that the amount of reactive hydroxyl groups present therein is from 0.2 to 0.6 mol, and
(B2) of a tri- or tetrahydric polyol which has been partly esterified with (meth)acrylic acid and has a residual average hydroxyl functionality of from 1.0 to 1.4 in the molecule, in an amount such that the amount of the reactive groups is from 0.4 to 0.8 mol, the amounts of (B1) and (B2) being chosen so that the sum of the amounts of the reactive hydroxyl groups of (B1) and (B2) in the first step is always 1.0 mol, in such a way that from about 40 to about 60%, preferably from about 45 to about 55% and, with particular preference, 50% of the isocyanate groups of (A) are converted into urethane groups, and subsequently, in a second step, reacting the resulting intermediate with (C) an aliphatic saturated monocarboxylic acid having at least two hydroxyl groups, in an amount such that the amount of the reactive hydroxyl groups is from 0.6 to 1 mol, until the hydroxyl groups (C) have undergone complete reaction, and, if desired, in a third step reacting this product with further polyol (B2) in an amount such that the amount of hydroxyl groups of this portion of (B2) is from 0 to 0.5 mol, until the remaining free isocyanate groups have undergone complete reaction, the molar proportions of the components (A) to (C) in all three steps being chosen so that the number of isocyanate groups present in component (A) and the number of hydroxyl groups present in total in components (B1), (B2) and (C) are in a ratio to one another of from 0.9:1 to 1:1 and the reaction product possesses carboxyl groups in accordance with an acid number of from 20 to 40 mg/g and has a specific double bond content (molar amount of ethylenic double bonds relative to the mass of the urethane resin solids) of not more than 3.5 mol/kg.

These resins can be formulated as aqueous dispersions or solutions provided that some, preferably at least 40%, of the carboxyl groups present in the resin are converted to carboxylate groups by adding neutralizing agents such as alkali metal hydroxides or tertiary amines, before the product is mixed with water. The partially neutralized resin can then be subjected to normal or inverse dispersion (incorporating the resin into water or water into the resin, in either case with stirring), preferably under shear exerted by high-speed stirrers, dissolver discs, ultrasound dispersers or dispersers operating in accordance with the rotor-stator principle.

The figures given for the conversion of the isocyanate groups and for the degree of neutralization are to be understood such that the customary inaccuracy of the determination constitutes the delimitation of the values. Therefore, for example, "about 50% or "50%" denotes the range of 50% minus and plus the customary analytical accuracy; in other words, for a measurement error of 1.5, the range form 48.5 to 51.5%.

The invention also relates to a process for preparing these polyurethane resins which comprises up to three stages and in whose first stage (A) 1.0 mol of a cycloaliphatic and/or aromatic diisocyanate is reacted with a mixture (B) comprising (B1) a (meth)acryloyl-containing dihydroxy compound and (B2) a tri- or tetrahydric polyol which has been partly esterified with (meth)acrylic acid and has a residual average hydroxyl functionality of from 1.0 to 1.4 in the molecule, the amounts of (B1) and (B2) being chosen so that the amount of the reactive hydroxyl groups in (B1) ($n_{OH}$(B1)) is from 0.2 to 0.6 mol, and the amount of the reactive hydroxl groups in (B2) ($n_{OH}$(B2) is from 0.8 to 0.4 mol, the sum $n_{OH}$(B1)+$n_{OH}$(B2) always being equal to 1 mol, in such a way that 50% of the isocyanate groups of (A) are converted into urethane groups, and, in the second stage, the resulting intermediate is subsequently reacted with (C) from 0.3 to 0.5 mol of 2,2-bis(hydroxymethyl)-propionic acid until the hydroxyl groups of (C) have undergone complete reaction, and if desired, in the third stage, the product is reacted with further polyol (B2) in an amount such that the amount of hydroxyl groups of (B2) is from 0 to 0.5 mol, until the remaining free isocyanate groups have undergone complete reaction. The molar proportions of the components (A) to (C) are in a ratio to one another of from 0.9:1 to 1:1 and the reaction product possesses carboxyl groups in accordance with an acid number of 20 to 40 mg/g and has a specific double bond content (molar amount of ethylenic double bonds relative to the mass of the urethane resin solids) of not more than 3.5 mol/kg.

The invention further relates to the use of the urethane resins prepared in accordance with the invention as binders for water-dilutable coating materials which can be crosslinked by free-radical polymerization and/or by exposure to high-energy radiation.

DIN 53402 defines the acid number as the quotient of that mass $M_{KOH}$ of potassium hydroxide which is required to neutralize a sample for analysis, and the mass $m_B$ of this sample (mass of the solid in the sample in the case of solutions or dispersions); its customary unit is "mg/g."

Any cycloaliphatic or aromatic diisocyanate or mixtures thereof can be used as component (A). Compounds suitable as component (A) include the cycloaliphatic diisocyanates having 6 to 40 carbon atoms, preferably those having 6 to 15 carbon atoms, such as 1,4-cyclohexyl diisocyanate,1,1-methylene-bis(4-isocyanatocyclohexane) and so-called dimeryl isocyanate (1,2-bis(9-isocyanatononyl) -3-heptyl-4-pent-ylcyclohexane), and the aromatic diisocyanates having 6 to 20 carbon atoms, such as 2,4- and 2,6-diisocyanatotoluene ("TDI", especially the commercially obtainable isomer mixture bearing the designation tolylene diisocyanate), 1,5-napthylene diisocyanate, MDI (4,4'-methylenediphenyl diisocyanate), "TDI dimer" 1,3-bis(3-isocyanato-4-methylphenyl) 2, 4-dioxodiazetidine, "TDI urea" (N,N'-bis(4-methyl-3-isocyanatophenyl) urea and tetramethylxylylene diisocyanate. Particular preference is given to the use, as cycloaliphatic diisocyanate, of isophorone diisocyanate and, as aromatic diisocyanate, of tolylene diisocyanate.

Any desired components can be used as (B1). Component (B1), defined as a (meth)acryloyl-containing dihydroxy compound, generally comprises reaction products of diglycidyl compounds with (meth)acrylic acid as are obtained in an known manner by means of basic catalysis. It is possible to employ aliphatic, cycloaliphatic, or aromatic diglycidyl compounds, preference being given to aliphatic diglycidyl compounds derived from α, ω-diols having 4 to 10 carbon atoms or from polyoxyalkylenediols, preferably polyethylene glycol and polypropylene glycol or mixtures of these polyglycols that contain oxyalkylene groups. Particular preference is given, for example, to butanediol diglycidyl ether, hexanediol diglycidyl ether, polypropylene glycol diglycidyl ether (in which case the parent polypropylene glycol can have different degrees of polymerization), and cyclohexanedimethanol diglycidyl ether. It is also possible to employ diglycidyl esters, such as diglycidyl hexahydrophthalate, and aromatic compounds, such as bisphenol A diglycidyl ether and bisphenol F diglycidyl ether. The amount of (B1) should be such that there is from 0.2 to 0.6 mol of reactive hydroxyl groups in (B1) per mole of the diisocyanate compound (A). "Reactive" here means that the hydroxyl group concerned reacts with an isocyanate group of (A) to form a urethane group.

The compounds used as component (B2), which is defined as tri- or tetrahydric polyol which has been partly esterified with (meth)acrylic acid and has a residual average hydroxyl functionality of from 1.0 to 1.4 in the molecule, can be selected from any desired components meeting this definition, and are generally partial esterification product of (meth) acrylic acid with tri- or tetrahydric polyols or mixtures thereof. In this context it is also possible to use reaction products of such polyols with ethylene oxide or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Compounds employed with preference are alkoxylated polyols having not more than two alkoxy groups per hydroxyl functionality, and ε-caprolactone-modified polyols. These modified or unmodified polyols are partly esterified with acrylic acid, methacrylic acid or mixtures thereof until the desired residual hydroxyl functionality is reached.

In the first step component (B2) is employed in an amount such that there is from 0.4 to 0.8 mol of reactive hydroxyl groups in (B2) per mole of the diisocyanate compound (A). Where a further amount of component (B2) is employed n the third step, its amount should then be such that for each mole of the diisocyanate compound (A) between 0 and 0.5 mol of reactive hydroxyl groups originate from the addition of (B2) in the third step. In the third step, further polyol (B2) is generally added when following the reaction with component (C) in the second step there are still unconsumed isocyanate groups in the reaction product of the second stage. The (B2) used in the optional third step can be the same or different from the (B2) used in the first step.

As component (C) it is possible to employ all saturated aliphatic carboxylic acids having at least two hydroxyl groups per molecule or mixtures of such acids. Examples of those suitable include dihydroxysuccinic acid, tartaric acid and, with particular preference, 2,2-bis(hydroxymethyl) propionic acid, which is also obtainable commercially under the designation dimethylolpropionic acid (DMPA). In the case of dihydroxy acids, the molar amount to be employed is from 0.3 to 0.5 mol (molar amount of hydroxyl groups from 0.6 to 1 mol) per mole of the diisocyanate compound (A).

To carry out the process of the invention the component (A) is introduced as initial charge in the first stage and a mixture of component (B1) and component (B2) is added over a period of, for example, from preferably 30 minutes to 6 hours, taking into account the exothermic reaction that takes place, and preferably at a rate such that the "critical" monourethane formation temperature is not exceeded.

The amounts of components (A), (B1) and (B2) here are chosen such that per mole of component (A) there are from 0.2 to 0.6 mol of reactive hydroxyl groups from (B1) and from 0.4 to 0.8 mol of reactive hydroxyl groups from (B2), the sum of the amounts of the reactive hydroxyl groups of (B1) and (B2) always being 1.0 mol.

The reaction temperature is generally in the range from 30 to 60° C. and is dependent on the starting materials (reactants) and must be determined experimentally for every combination in preliminary experiments. The reaction mixture is stirred until the theoretical residual content of unreacted isocyanate groups is reached.

Only at very close to quantitative reaction of these diisocyanate to the corresponding "monourethanes" are the required end products of low molecular mass obtained from which stable dispersions can be prepared (see Comparative Example C1).

Subsequently, in the second stage, the intermediate obtained in this way is reacted with compound (C) (preferably with 2,2-bis (hydroxymethyl) propionic acid as component (C)) at preferably 70 to 95° C. until the hydroxyl groups of component (C) have undergone a complete reaction. Should this result in an excessive viscosity of the reaction mixture it is possible to add to this mixture solvents which are inert with respect to isocyanate groups, form an azeotrope with water, and can be removed from the aqueous dispersion later on by means of distillation.

The amount of component (C) here is such that for each mole of the diisocyanate compound from the first stage from 0.6 to 1 mol of hydroxyl groups (from 0.3 to 0.5 mol of component (C) if dihydroxy acids are employed) are introduced into the reaction by component (C).

In a third stage, if desired, further amounts of component (B2) are added. This amount is chosen so that there is up to 0.5 mol of hydroxyl groups in this additional amount of (B2) per mole of diisocyanate (A) employed. Subsequently, the reaction mixture is maintained preferably at not more than 100° C. until all of the isocyanate groups have undergone complete reaction.

The amounts of components (A) to (C) in all three stages are chosen so that the molar amounts (or numbers) of all of the isocyanate groups and reactive hydroxyl groups present in components (A) to (C) are in a ratio to one another of from 0.9:1 to 1:1 and so that the reaction product possesses carboxyl groups in accordance with an acid number of from 20 to 40 mg/g and has a specific double bond content (molar amount of ethylenic double bonds relative to the mass of the urethane resin as solids) of not more than 3.5 mol/kg (=mmol/g).

The resins obtained can be subsequently neutralized at least in part, preferably by at least 40%, by adding suitable neutralizing agents. As such compounds preference is given to employing the alkali metal hydroxides, and of these especially lithium hydroxide, although tertiary amines are likewise used with preference. The neutralized resin is then subjected to direct or inverse dispersion in water.

The selection of specific raw materials and the adopted synthesis path therefore make it possible to prepare urethane resins of low viscosity. They are used, for example, as binders for coating materials which can be crosslinked by free-radical polymerization, especially by means of UV irradiation, and which in their use form are free from monomers. On evaporation of water, coating materials of this kind produce a physically drying film which after it has cured has a high degree of crosslinking.

The formulations of coating materials for the various end uses, and also the preparation and processing of such coating materials, are known to the skilled worker and can be taken from the technical literature.

Aqueous coating compositions comprising the urethane resins of the invention are particularly suitable for formulating coating materials for heat-sensitive substrates such as paper, cardboard, wood, cork, plastics or textiles.

The examples elucidate the invention without restricting it in its scope.

In the examples below, as in the preceding text, all figures with the unit "%" are proportions by mass unless stated otherwise. "Parts" (abbreviated "p") are always parts by mass. Concentration figures in "%" are proportions by mass of the dissolved substance in the solution.

The examples employ the following abbreviations for parameters and raw materials:
SEG specific epoxide group content The specific epoxide group content SEG is the quotient of the molar amount of epoxide groups n(EP) and the mass m of the epoxide:

$$SEG = \frac{n(EP)}{m}$$

EEW "epoxide equivalent weight" (reciprocal of the SEG)

DBC specific double bond content

The specific double bond content DBC is the quotient of the molar amount of ethylenic double bonds n(>C=C<) and the mass m of the unsaturated compound:

$$DBG = \frac{n(>C=C<)}{m}$$

Hydroxyl Number

The hydroxyl number is defined in accordance with DIN 53 240 as the quotient of that mass $m_{kOH}$ of potassium hydroxide which has just as many hydroxyl groups as a sample to be analysed, and the mass $m_B$ of this sample (mass of solids in the sample in the case of solutions or dispersions); its customary unit is "mg/g".

Component (A)

IPDI isophorone diisocyanate

TDI tolylene diisocyanate

Component (B1)

(B1-1) Reaction product of 230 p (1 mol) of hexanediol diglycidyl ether (SEG=8700 mmol/kg; EEW=115 g/mol) with 144 p (2 mol) of acrylic acid, n(OH)=2 mol hydroxyl number=240 mg/g DBC=4.30 mmol/g (B1-2) Reaction product of 680 p of polypropylene glycol diglycidyl ether (Beckopox® EP 075; Vianova Resins GmbH; SEG=2940 mmol/kg; EEW=340 g/mol) with 144 p (2 mol) of acrylic acid n(OH)=2 mol hydroxyl number= 136 mg/g DBC=2.42 mmol/g (B1-3) Reaction product of 202 p (1 mol) of butanediol diglycidyl ether (SEG=9900 mmol/kg; EEW=101 g/mol) with 144 p (2 mol) of acrylic acid n(OH)=2 mol hydroxyl number=278 mg/g DBC=4.95 mmol/g Component (B2)

(B2-1) Reaction product of 134 p (1 mol) of trimethylolpropane, which has been "extended" with 256.5 p (2.25 mol) of ε-caprolactone, and 137 p (1.9 mol) of acrylic acid n(OH)=1.10 mol hydroxyl number=125 mg/g DBC=3.85 mmol/g (B2-2) Reaction product of 170 p (1 mol) of "TMP-0,8 EO" (polyol TP 08; from Perstorp Polyols, SE; reaction product of 0.8 mol of ethylene oxide per mole of trimethylolpropane), which has been "extended" with 228 p (2 mol) of ε-caprolactone, and 133.2 p (1.85 mol) of acrylic acid n(OH)=1.15 mol hydroxyl number=130 mg/g DBC=3.71 mmol/g (B2-3) Reaction product of 430 p (1 mol) of penta-5 PO (polyol PS 50; from Perstorp Polyols, SE; reaction product of 5 mol of propylene oxide per mole of pentaerythritol) with 205.2 p (2.85 mol) of acrylic acid n(OH)=1.15 mol hydroxyl number=110 mg/g DBC=4.88 mmol/g (B2-4) Reaction product of 250 p (1 mol) of ditrimethylolpropane, which has been "extended" with 347.7 p (3.05 mol) of ε-caprolactone, and 212.4 p (2.95 mol) of acrylic acid n(OH)=1.05 mol hydroxyl number= 78 mg/g DBC=3.89 mmol/g Component (C)

DMPA 2,2-bis(hydroxymethyl)propionic Acid

1. Preparation of radiation-curable water-dilutable urethane resins (Examples 1 to 3)

1.1 Preparation of UR1 (Example 1)

In accordance with the data in Table 1 the corresponding amount of component (A-1) was introduced as initial charge into a suitable reaction vessel together with 0.1%, based on the mass of (A-1), of dibutyltin dilaurate. The mixture of components (B1-1) and (B2-1) was added dropwise over 1 to 3 hours taking into account the slightly exothermic reaction, the reaction temperature not being permitted to exceed 55° C. The mixture was held at this temperature until a residual content of isocyanate groups of 7.0% was reached.

Subsequently, DMPA and a polymerization inhibitor ("BHT", butylated hydroxytoluene) were added. The reaction temperature was raised to 90° C., in the course of which air was passed continuously through the mass. To reduce the viscosity an organic solvent was used which is reaction-inert with respect to isocyanate groups and forms an azeotrope with water.

After an isocyanate group content of about 0.3% was reached, component (B2-4) was added. The mixture was held at 95° C. until free isocyanate groups were no longer detectable.

Finally, the reaction product was neutralized in accordance with the data in Table 1 and was diluted with deionized water. Before the product was adjusted to the desired solids content, the organic solvent used was removed by distillation.

1.2 PreDaration of UR2 and UR3 (Examples 2 and 3)

The procedure was in accordance with the data in Table 1 and the information in Example 1; in Example 2, dibutyltin dilaurate was not added until after the addition of DMPA. The table indicates in each case the masses m of the components employed, in g, and their molar amounts, n in mol.

The ratio of the molar amount of isocyanate groups n(NCO) to the molar amount of hydroxyl groups n(OH) is equal to the proportion of the number of these groups N(NCO) :N(OH) and is expressed in mol/mol or stated as an undesignated number.

LiOH is employed for the neutralization; the mass of the neutralizing agent, m(LiOH), is stated in g. The degree of neutralization indicates what proportion (in %) of the acid groups have been converted into carboxylate groups, the reference (100%) being in each case the sum of the number of carboxylate groups and carboxyl groups.

TABLE 1

|  | Example 1 UR1 m/g (n/mol) | Example 2 UR2 m/g (n/mol) | Example 3 UR3 m/g (n/mol) |
| --- | --- | --- | --- |
| (A-1) (IPDI) | 222 (1.0) |  | 222 (1.0) |
| (A-2) (TDI) |  | 174 (1.0) |  |
| (B1-1) | 70.1 (0.30) |  |  |
| (B1-2) |  | 103.1 (0.25) |  |
| (B1-3) |  |  | 70.6 (0.35) |
| (B2-1) | 314.2 (0.70) |  |  |
| (B2-2) |  |  | 129.5 (0.30) |
| (B2-3) |  | 382.5 (0.75) |  |
| (B24) |  |  | 251.7 (O.35) |
| Reaction temperature | <60° C. | <35° C. | <60° C. |
| NCO content | 7.0% | 6.4% | 6.3% |
|  | m/g (n/mol) | m/g (n/mol) | m/g (n/mol) |
| (C) (DMPA) | 64.3 (0.48) | 67.0 (0.5) | 64.3 (0.48) |
| Reaction temperature | <95° C. | <95° C. | <95%° C. |
| NCO content | 0.26 . . . 0.35% | 0% | 0.23 . . . 0.33% |

TABLE 1-continued

|  | Example 1 UR1 m/g (n/mol) | Example 2 UR2 m/g (n/mol) | Example 3 UR3 m/g (n/mol) |
|---|---|---|---|
| (B2-2) | m/g (n/mol) |  | m/g (n/mol) 51.8 (0.12) |
| (B2-4) | 71.9 (0.10) |  |  |
| Reaction temperature | <100° C. |  | <100° C. |
| NCO content at end | 0% |  | 0% |
| n(NCO):n(OH) | 0.97:1 | 1:1 | 0.96:1 |
| Acid number in mg/g | 36.3 | 38.6 | 34.1 |
| m(LiOH) in g | 7.14 | 6.60 | 8.06 |
| Degree of neutralization | 62% | 55% | 70% |
| DBC in mmol/g | 2.41 | 2.91 | 2.53 |

2 Comparative Examples C1 and C2

2.1 Comparative Example C1

The procedure was as in Example 2 except that the temperature for the reaction of components (A-2), (B1-2) and (B2-2) was raised to 45° C. The result was a highly viscous end product which could not be diluted with water.

2.2 Comparative Example C2

In accordance with Example 4 of EP 0 694 531 A2, herein incorporated by reference in its entirety, (n(NCO) :n(OH)= 1.38:1, DBC=2.81 mmol/g)

3 Performance Testing of the Water-dilutable Urethane Resins Prepared in Accordance with Examples 1 to 3 and in Accordance with Comparative Example C2

Water-thinnable UV-curable clearcoat Formula (masses in g)

| 100.0 | urethane resin, 40% aqueous dispersion |
|---|---|
| 0.5 | antifoam, silicone-free |
| 1.0 | substrate wetting agent |
| 2.0 | photoinitiator (Darocur ® 1173, Ciba Spezialitäten-Chemie AG) |
| 5.0 | water, deionized |
| 108.5 |  |

The coating materials, prepared in a customary manner, were adjusted to a pH of 7.9 to 8.3 by adding a 5% strength solution of LiOH in water, diluted with deionized water to the required viscosity, and applied to glass plates by spraying.

Curing Conditions

Forced air drying at 55° C. for 5 minutes, UV curing with high-pressure mercury lamps, 80 watts/cm, source/coating distance about 10 cm, belt speed 4 m/min.

Test Methods and Test Results:

Physical Drying

Glass plates, film thickness (wet film) 150 μm, drying at 50° C. for 10 minutes (convection oven); directly thereafter a gentle pressure was exerted on the surface of the coating using a clean, dry fingertip. The coating film is regarded as having physically dried when no fingertip imprint is evident.

| Assessment: | ++ | very good |
|---|---|---|
|  | + | good |
|  | − | unsatisfactory |

Pendulum Hardness:

This was determined in accordance with DIN 53157 on a coating film with a film thickness (wet film) of 150 μm on glass plates.

Acetone Resistance:

This was determined in accordance with DIN 68861 likewise on glass plates with a wet film thickness of 150 μm.

TABLE 2

| Clearcoat with binder of Example | 1 | 2 | 3 | C2 |
|---|---|---|---|---|
| Physical drying | + | ++ | + | − |
| Pendulum hardness in s | 170 | 200 | 140 | 165 |
| Acetone resistance in min | 180 | 210 | 180 | about 180 |

The positive properties in respect of solvent resistance and pendulum hardness were retained, with considerably improved physical drying, when urethane resin according to the present invention were used.

Austrian Application A-599/97, filed Apr. 9, 1997, the priority document of the present application is hereby incorporated by reference in its entirety.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

What is claimed is:

1. A radiation-curable, water-dilutable urethane resin obtained by reacting, in a first reaction step,
   (A) 1.0 mol of one or more of a cycloaliphatic or aromatic diisocyanate with
   (B1) a (meth)acryloyl-containing dihydroxy compound in an amount such that the amount of reactive hydroxyl groups in (B1) is from 0.2 to 0.6 mol, and
   (B2) a tri- or tetrahydric polyol which has been partly esterified with (meth)acrylic acid and has a residual average hydroxyl functionality of from 1.0 to 1.4 in the molecule, in an amount such that the amount of the reactive hydroxyl groups in (B2) is from 0.4 to 0.8 mol, the amounts of (B1) and (B2) being chosen so that the sum of the amounts of the reactive hydroxyl groups of (B1) and (B2) in the first step is 1.0 mol, whereby from 40 to 60% of the isocyanate groups of (A) are converted into urethane groups; and subsequently reacting the resulting intermediate with
   (C) an aliphatic saturated monocarboxylic acid having at least two hydroxyl groups, wherein the amount of the reactive hydroxyl groups in (C) is from 0.6 to 1 mol, until the hydroxyl groups (C) have undergone complete reaction, and, optionally, reacting this product with further polyol (B2) in an amount such that the amount of hydroxyl groups of (B2) is from 0 to 0.5 mol, until the remaining free isocyanate groups have undergone complete reaction, the molar proportions of the components (A) to (C) being chosen so that the number of isocyanate groups and hydroxyl groups present in components (A) to (C) are in a ratio to one another of from 0.9:1 to 1:1, and wherein the reaction product possesses carboxyl groups in accordance with an acid number of from 20 to 40 mg/g and has a specific double bond content of not more than 3.5 mol/kg.

2. A radiation-curable water-dilutable urethane resin according to claim 1, wherein compound (A) is selected from one or more of 2,4- and 2,6-diisocyanatotoluene and isophorone diisocyanate.

3. A radiation-curable water-dilutable urethane resin according to claim 1, wherein (B1) comprises one or more aliphatic diglycidyl compound.

4. Radiation-curable water-dilutable urethane resin according to claim 1, wherein (B2) comprises one or more partial esterification products of (meth)acrylic acid with tri- or tetrahydric polyols, which polyols have been modified by reaction with ethylene oxide or propylene oxide or with lactones which can be added in a ring-opening reaction.

5. A radiation-curable water-dilutable urethane resin according to claim 1, wherein component (C) comprises 2,2-bishydroxymethylpropionic acid.

6. A process for preparing radiation-curable water-dilutable urethane resins according to claim 1, wherein a first stage (A) 1.0 mol of one or more of a cycloaliphatic or aromatic diisocyanate is reacted with a mixture (B) comprising (B1) a (meth)acryloyl-containing dihydroxy compound and (B2) a tri- or tetrahydric polyol which has been partly esterified with (meth)acrylic acid and has a residual average hydroxyl functionality of from 1.0 to 1.4 in the molecule, the amounts of (B1) and (B2) being chosen so that the amount of the reactive hydroxyl groups in (B1) ($n_{OH}$(B1)) is from 0.2 to 0.6 mol and the amount of the reactive hydroxyl groups in (B2) ($n_{OH}$(B2)) is from 0.8 to 0.4 mol, the sum $n_{OH}$(B1)+$n_{OH}$(B2) being equal to 1 mol, in such a way that 50% of the isocyanate groups of (A) are converted into urethane groups, and, in the second stage, the resulting intermediate is subsequently reacted with (C) an aliphatic saturated monocarboxylic acid having at least two hydroxyl groups in an amount such that the amount of the reactive hydroxyl groups is from 0.6 to 1 mol until the hydroxyl groups of (C) have undergone complete reaction, and optionally, in a third step, the product is reacted with further polyol (B2) in an amount such that the amount of hydroxyl groups of this portion of (B2) is from 0 to 0.5 mol, until the remaining free isocyanate groups have undergone complete reaction, the molar proportions of the components (A) to (C) in all three steps being chosen so that the number of isocyanate groups present in component (A) and the number of hydroxyl groups present in total in components (B1), (B2), and (C) are in a ratio to one another of from 0.9:1 to 1:1; and wherein the reaction product possesses carboxyl groups in accordance with an acid number of 20 to 40 mg/g and has a specific double bond content of not more than 3.5 mol/kg.

7. An aqueous dispersion of a radiation-curable water-dilutable urethane resin comprising a urethane resin according to claim 1, in which at least 40% of the carboxyl groups originally present in the resin of claim 1 have been converted into carboxylate groups.

8. A process for preparing an aqueous dispersion of radiation-curable water-dilutable urethane resin, comprising converting at least 40% of the carboxyl groups present in the resin of claim 1 into carboxylate groups, by adding one or more of alkali metal hydroxides or tertiary amines, and subsequently dispersing the neutralized resin by mixing it with water under shear conditions.

9. An aqueous, radiation-crosslinkable coating composition comprising a urethane resin according to claim 1.

10. Wood coated with a coating composition according to claim 9.

* * * * *